United States Patent
Hammer

[11] 4,018,506
[45] Apr. 19, 1977

[54] FIBER-OPTIC TO PLANAR-WAVEGUIDE OPTICAL COUPLER

[75] Inventor: Jacob Meyer Hammer, Lawrenceville, N.J.

[73] Assignee: RCA Corporation, New York, N.Y.

[22] Filed: Nov. 12, 1975

[21] Appl. No.: 631,327

[52] U.S. Cl. .................. 350/96 C; 350/96 WG
[51] Int. Cl.² ............................... G02B 5/14
[58] Field of Search ........ 350/96 C, 96 WG, 162 R

[56] References Cited
UNITED STATES PATENTS

| | | | |
|---|---|---|---|
| 3,674,335 | 7/1972 | Ashkin et al. | 350/96 C |
| 3,791,715 | 2/1974 | Lean et al. | 350/96 C |
| 3,871,742 | 3/1975 | Kaminow et al. | 350/96 C |
| 3,912,363 | 10/1975 | Hammer | 350/96 C |
| 3,967,877 | 7/1976 | Heidrich et al. | 350/96 C |

OTHER PUBLICATIONS

Ash et al., "Interconnection of Optical Fibers to Planar Optical Integrated Circuitry," IBM Tech. Disc. Bull. vol. 13, No. 9, Feb. 1971.
Lean et al., "Coupling Light from a Fiber-Optic Waveguide into a Thin-film Waveguide," IBM Tech. Disc. Bull., vol. 15, No. 12, May 1973, pp. 3809-3810.

*Primary Examiner*—John K. Corbin
*Assistant Examiner*—Stewart Levy
*Attorney, Agent, or Firm*—Edward J. Norton; H. Christoffersen; George J. Seligsohn

[57] ABSTRACT

By coupling light from a coupling portion of a thin fiber core to a planar waveguide film through the thickness of the substrate supporting the film, sufficient spreading by diffraction takes place in the light traveling through the thickness of the substrate to provide an aperture at the film large enough to permit light coupled into the film from the substrate to have a substantially plane wavefront.

2 Claims, 3 Drawing Figures

FIBER-OPTIC TO PLANAR-WAVEGUIDE OPTICAL COUPLER

The Government has rights in this invention pursuant to Contract No. N00014-75-C-0436 awarded by the Department of the Navy.

BACKGROUND OF THE INVENTION

This invention relates to optical couplers and, more particularly, to optical couplers for coupling light between a fiber-optic and a planar waveguide.

Recent developments in optical communications have provided low-loss fiber-optic waveguides, which are employed as transmission lines, and thin-film planar optical waveguides for performing optical processing, such as switching, modulation, etc. This has provided a need for improved optical couplers for coupling light between the fiber-optic and the planar waveguide. An example of one such optical waveguide coupler is disclosed in my U.S. Pat. No. 3,912,363, issued Oct. 14, 1975, and assigned to the same assignee as the present application.

SUMMARY OF THE INVENTION

Many types of optical processing devices within planar optical waveguides, such as a grating modulator, require for their proper operation that the light in the planar optical waveguide have a substantially plane wavefront. However, the diameter of many fiber cores, particularly single mode fibers, is on the order of only a few micrometers. Light coupled from such thin fiber cores directly into a planar optical waveguide, by phase-matched evanescent fields for example, normally has a diverging wavefront, rather than the desired plane wavefront, because of the relatively small coupling aperture between such a thin fiber core and the planar optical waveguide. The present invention is directed to a simple technique for increasing the efffective aperture for coupling light between a thin fiber core and a planar optical waveguide by a sufficient amount to provide a substantially plane wavefront for the coupled light within the planar optical waveguide. This is accomplished by coupling the light from the fiber optic core to a planar waveguide film through the thickness of a substrate which supports a planar waveguide film in a manner such that the coupled light in traveling through the substrate is spread by diffraction to provide a relatively large aperture at the coupling interface between the substrate and the planar waveguide film.

THE DRAWING

DETAILED DESCRIPTION

Figure 1:
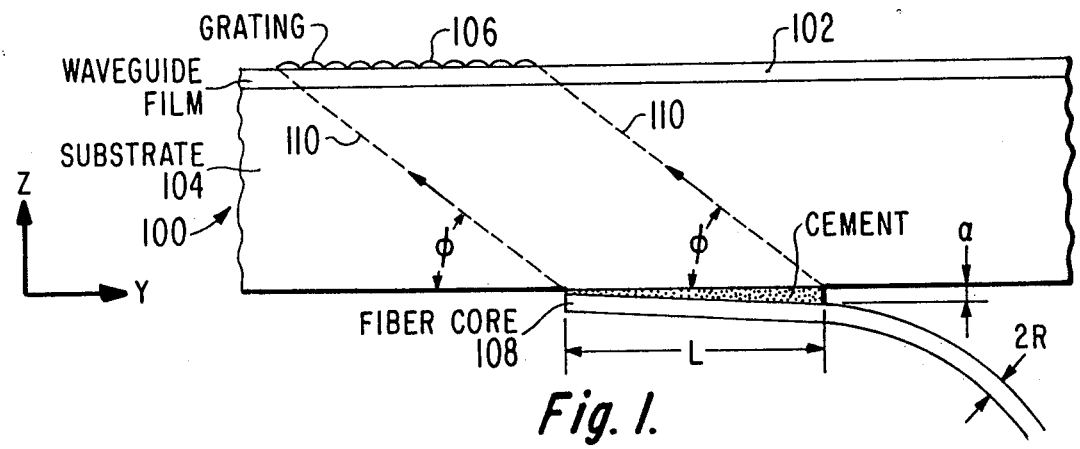
FIG. 1 is a side view showing an arrangement for coupling light through the thickness of a substrate supporting a waveguide film, which has a coupling grating disposed on the surface thereof.

Referring now to FIG. 1, there is shown planar waveguide means 100 comprising waveguide film 102, supported by substrate 104, which has a grating 106 on a portion of the exposed surface of film 102. By way of example, waveguide film 102 may be a thin film of lithium niobate tantalate having an index of refraction of approximately 2.20, while substrate 104 may consist of an approximately 1 mm. thick slab of lithium tantalate having an index of refraction of approximately 2.18. Diffraction grating 106, which may be of the type disclosed in the aforesaid U.S. Pat. No. 3,912,363, has a predetermined line spacing and angular orientation which determines the relative direction of travel of coupled light within planar optical waveguide film 102 with respect to incident light from outside of waveguide film 102 arriving in the vicinity of grating 106.

Specifically, as shown in FIG. 1, fiber-optic core 108 has a diameter 2R and has a coupling portion of length L in proximity to the bottom surface of substrate 104 of planar waveguide means 100. By way of example, length L may be approximately 217 $\mu$m., the diameter 2R may be 4 $\mu$m. and fiber optic core 108 may have an index of refraction of approximately 1.46, which is substantially lower than the index of refraction of substrate 104. Because the index of refraction of substrate 104 is higher than that of fibr-optic core 108, light within the coupling portion of fiber-optic core 108 is coupled into substrate 104 by phase-matched evanescent fields therebetween. Further, as is known in the art of prism film couplers, the coupled light 110 travels in substrate 104 in a direction parallel to the y-z plane (length-thickness plane of substrate 104), which is inclined at an angle $\theta$ with respect to the y axis as shown in FIG. 1. Specifically, as is known in the art, the value of $\theta$ is equal to the arcosine of the ratio of the index of refraction of fiber-optic core 108 (e.g. 1.46) to the index of refraction of substrate 104 (e.g. 2.18). Under the assumed conditions $\theta$ has a value of approximately 48°.

The length L of the coupling portion of fiber-optic core 108 may be oriented parallel to the length of substrate 104 to provide uniform coupling gap therebetween. However, preferably, the coupling portion of fiber optic core 108 should be tapered at a small angle $\alpha$, as shown in FIG. 1, to provide a coupling gap which is relatively large at the right end of the coupling portion of fiber-optic core 108, where the original light intensity of the light within fiber-optic core 108 is relatively high, and a relatively small gap at the terminating left end of the coupling portion of fiber-optic core 108, where the light intensity of the light still remaining in fiber-optic core 108 is relatively low. Physically, the coupling portion of fiber-optic core 108 may be rigidly attached to the bottom of substrate 104 by a cement, such as a clear epoxy having an index of refraction either equal to or in between the indices of refraction of fiber-optic core 108 and substrate 104. Also, the relative positions along the y axis of the coupling portion of fiber-optic core 108, situated on the bottom surface of substrate 104, and of grating 106, situated on the top surface of waveguide film 102, is selected so that the coupled light 110 is directed to and is incident on diffraction grating 106, as shown in FIG. 1.

Figure 2:
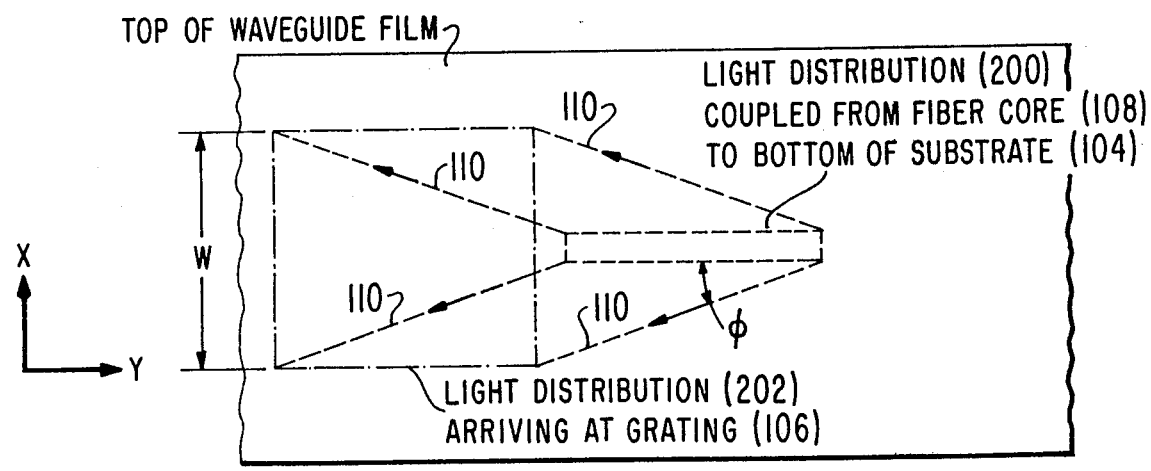
FIG. 2 is a top view showing the light distribution coupled from the fiber core to the bottom of the substrate and the light distribution arriving at the grating after passing through the thickness of the substrate.

As indicated in FIG. 2, by parallel-lines 200, the light distribution coupled from fiber core 108 to the bottom of substrate 104 has a width substantially equal to the diameter 2R of fiber core 108, i.e., approximately 4 $\mu$m. However, in traveling from the bottom of substrate 104 to grating 106 through the thickness of substrate 104 over diverging light path 110, as shown in FIG. 2. Therefore, the light distribution 202 arriving at grating 106, has a width W parallel to the x axis which is many times larger than the 4 μm. width of the light distribution 200 coupled from fiber core 100 to the bottom of substrate 104.

Figure 3:
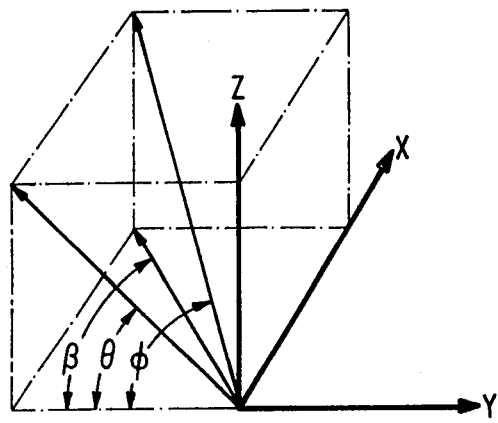
FIG. 3 is a three-dimensional vector diagram indicating the direction of travel and spread of the coupled light passing through the thickness of the substrate.

The geometric relationship between the angle $\theta$, shown in FIG. 1, and $\phi$ in FIG. 2, is indicated by the vectors of FIG. 3. In particular, as shown in FIG. 3, vector 300, which lies in a y-z plane is inclined at angle $\theta$ with respect to the y axis, which corresponds to the showing of angle $\theta$ in FIG. 1. However, vector 302, which is a diagonal of a rectangular parallelpiped, is oriented with respect to the y axis at an angle $\phi$, which corresponds to the angle $\phi$ shown in FIG. 2. Vector 304, which corresponds to the projection of vector 302 in the x-y plane, is oriented at an angle $\beta$ with respect to the y axis.

Angle $\beta$ corresponds to the spread of light 110 in the x-y plane due to diffraction experienced in its travel through the thickness of substrate 104 from the bottom thereof to grating 106. Quantitatively, the value of $\beta$ is approximately equal to the arc sine of the light wavelength (e.g. 632.8 nm) divided by the product of the index of refraction of substrate 104 (e.g. 2.18) and the diameter 2R of fiber-core 108 (e.g. 4 μm.) Under the assumed conditions, $\beta$ has a value approximately equal to 4.16°. It can be shown trigonometrically that the value W/2 in FIG. 2 is equal to the thickness of substrate 104 (e.g. 1 mm) divided by the product of the cosine of $\beta$ and the tangent of $\theta$. Thus, if $\theta=48°$ and $\beta=4.16°$, the value of W in FIG. 2 turns out to be substantially equal to 217 μm (which is the same value as that selected for the length L of the coupling portion of fiber-optic 108). Therefore, the light distribution 202 arriving at grating 106, shown in FIG. 2, provides a substantially square coupling aperture, with a light wavelength of 632.8 nm, a value of W of 100 μm or greater is required for the coupling aperture at grating 106 in order to ensure a sufficiently plane wavefront for the light coupled into waveguide film 102. Thus, a dimension of 217 mm for the square coupling aperture is more than adequate for providing the required substantially plane wavefront for the light coupled into waveguide film 102 by grating 106.

What is claimed is:
1. In combination:
 a substrate of a first given index of refraction and of a given thickness supporting on one face thereof a planar optical waveguide film having an index of refraction higher than said first given index of refraction, and
 a fiber-optic core of given diameter having a coupling portion of given length situated in proximity to the opposite face of said substrate from said one face thereof, said core having a given index of refraction lower than said first index of refraction for coupling light of a given wavelength from said core to said substrate by phase-matched evanescent fields, said given diameter being sufficiently small relative to said given wavelength to cause coupled light in said substrate to diverge by diffraction to a given width in traveling through the given thickness of said substrate from said opposite face thereof to said one face thereof, said given width and said given length being sufficiently large relative to said given wavelength to provide an aperture at said one face having a size which permits said light in said substrate arriving at said aperture to be further coupled by phase-matched evanescent fields into said film with a substantially plane wavefront.

2. The combination defined in claim 1, wherein said film has disposed thereon an evanescent-field, phase-matching diffraction grating which is positioned at said aperture for coupling said light in said substrate arriving at said aperture into said film with a substantially plane wavefront and directing said light coupled into said film along a given path.

* * * * *